United States Patent
Yao

(10) Patent No.: US 6,417,957 B1
(45) Date of Patent: Jul. 9, 2002

(54) OPTO-ELECTRONIC DEVICES FOR PROCESSING AND TRANSMITTING RF SIGNALS BASED ON BRILLOUIN SELECTIVE SIDEBAND AMPLIFICATION

(75) Inventor: Xiaotian Steve Yao, Diamond Bar, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/699,297

(22) Filed: Oct. 27, 2000

Related U.S. Application Data
(60) Provisional application No. 60/161,877, filed on Oct. 27, 1999.

(51) Int. Cl.[7] .............................. H01S 3/00; H01S 3/98
(52) U.S. Cl. .................................. 359/334; 250/227.11
(58) Field of Search ................................. 359/334, 156, 359/187, 327; 250/227.11

(56) References Cited

U.S. PATENT DOCUMENTS

| 5,200,964 A | * | 4/1993 | Huber | ............................ 372/26 |
| 5,295,209 A | | 3/1994 | Huber | |
| 5,723,856 A | | 3/1998 | Yao et al. | |
| 5,777,771 A | | 7/1998 | Smith | |
| 5,777,778 A | | 7/1998 | Yao | |
| 5,825,791 A | * | 10/1998 | Injeyan et al. | ................ 372/26 |
| H1791 H | | 3/1999 | Williams | |
| 5,917,179 A | | 6/1999 | Yao | |
| 5,929,430 A | | 7/1999 | Yao et al. | |
| 6,178,036 B1 | * | 1/2001 | Yao | ............................. 359/334 |

FOREIGN PATENT DOCUMENTS

WO    WO 00/44074    7/2000

* cited by examiner

Primary Examiner—Mark Hellner
(74) Attorney, Agent, or Firm—Fish & Richardson P.C.

(57) ABSTRACT

Systems and techniques for transmitting and processing an electrical signal through an opto-electronic system with an optical Brillouin amplifier.

36 Claims, 5 Drawing Sheets

OPTO-ELECTRONIC DEVICES FOR PROCESSING AND TRANSMITTING RF SIGNALS BASED ON BRILLOUIN SELECTIVE SIDEBAND AMPLIFICATION

This application claims the benefit of U.S. Provisional Application No. 60/161,877, filed Oct. 27, 1999.

ORIGIN OF THE INVENTION

The invention described herein was made in the performance of work under a NASA contract, and is subject to the provisions of Public Law 96-517 (35 U.S.C. 202) in which the Contractor has elected to retain title.

BACKGROUND

This application relates to radio frequency devices, and more particularly, to opto-electronic devices and techniques for processing and transmitting radio frequency signals.

Optical waves can be used as carriers to transmit radio frequency (RF) signals from one location to another. In addition, the characteristics of a RF signal may be modified by optical techniques. This combination of RF technology and photonic technology can be used to achieve certain advantages and provide new devices and applications in signal processing and communications.

Brillouin selective sideband amplification of a RF signal is one example of combining RF technology and photonic technology for new devices and applications. See, U.S. Pat. No. 5,917,179 to Yao and U.S. patent application Ser. No. 09/006,845 filed on Jan. 14, 1998 by Yao (allowed and to be issued). An optical pump beam can be injected into a Brillouin optical medium to produce an acoustic grating moving in the direction of the pump beam based on the electrorestrictive effect. This grating interacts with the pump beam to produce a backscattered Brillouin optical wave at a frequency less than that of the pump beam.

When a narrow-band seed signal in the opposite direction of the pump wave and at the same frequency of the Brillouin optical wave is injected into the medium, the interaction between the seed signal and the pump wave can significantly enhance the acoustic grating and convert the spontaneous Brillouin scattering into a stimulated Brillouin scattering (SBS). The stimulated back scattering light adds up in phase with the seed signal to produce an amplified seed signal. This Brillouin amplification can be used to implement a signal amplification scheme to selectively amplify a RF sideband in a modulated optical signal. The narrow bandwidth of the Brillouin amplification is used to selectively amplify one or more desired RF sidebands and to leave the strong carrier signal essentially unchanged.

SUMMARY

The present disclosure includes systems and techniques for transmitting and processing a RF signal by using opto-electronic devices based on the Brillouin selective sideband amplification.

In one embodiment, a photonic RF link may be configured to achieve a number of signal processing operations in the optical domain, including frequency up or down conversion and signal amplification. The processing operations in the optical domain may be insensitive to the polarization state of light and substantially free of the fiber dispersion effect after transmission through a fiber link. Such a photonic RF link may also use low loss and less expensive optical phase modulators to avoid modulator bias problems in some optical intensity modulators.

For example, such a device may include an input terminal to receive an input electrical signal and an opto-electronic module. The module includes an optical amplifier with a Brillouin medium which produces a pump beam in the Brillouin medium to generate a Brillouin signal, and an optical ring unit which has an optical modulator to superimpose the input electrical signal onto an optical signal. The optical ring unit is adapted to couple the optical signal into the Brillouin medium in a way that its polarization is substantially identical to a polarization of the pump beam to selectively amplify a sideband in the optical signal. A photodetector is also included to convert the amplified optical signal into an output electrical signal.

DETAILED DESCRIPTION

The present systems and techniques for transmitting and processing an RF signal implement a special opto-electronic system between a RF source or a RF input terminal and a RF output terminal, both operating in the electrical domain. The opto-electronic system coupled between the input and output terminals, however, primarily operate in the optical domain. The input electrical signal is first converted into an optical signal by superimposing the RF signal onto an optical carrier. The optical signal is then processed and transmitted in the optical domain. The processed optical signal is converted back into the electrical domain at or near the RF output terminal to produce a desired electrical output.

The optical processing may include signal amplification and signal up or down conversion and can be used to process RF signals from several Gigahertz to tens of Gigahertz with high spectral purity and low phase noise. In particular, the optical processing is based on the Brillouin selective sideband amplification in a Brillouin optical medium. This amplification scheme is frequency selective. Both frequency up conversion and down conversion can be achieved by overlapping the frequency of the Brillouin signal with a desired sideband of the RF signal. In addition, an amplification modulation can be optically converted into a phase modulation to achieve low noise in signal processing.

The optical transmission may use a number of suitable optical links such as a free-space optical link and an optical fiber link. The optical fiber link is particularly suited for low-loss transmission over a sufficiently long distance when other transmission links are either too lossy or more expensive. The fiber line itself can provide both an optical conduit for signal transmission and a Brillouin medium for signal amplification. This eliminates a designated Brillouin medium. In addition, the Brillouin selective sideband amplification also substantially reduces the adverse effects of the fiber dispersion. This combination of the optical signal amplification and the low loss of the optical transmission in the optical fiber can be used to link the RF input and output terminals that are spatially separated from each other in some communication systems. Such a spatial separation between the RF terminals may be beneficial in certain applications.

Figure 1:
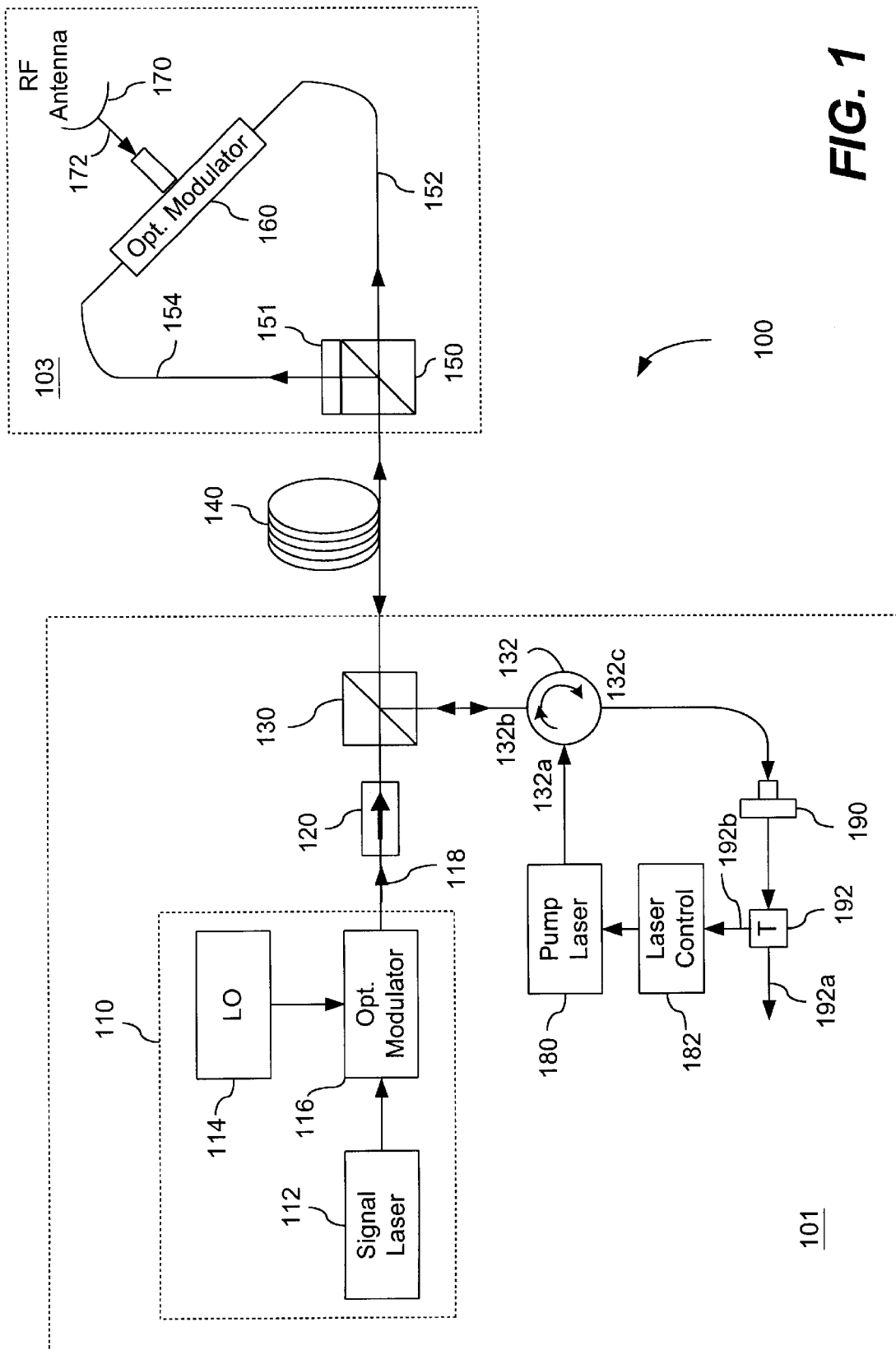
FIG. 1 shows one example of an opto-electronic system based on Brillouin selective sideband amplification according to one embodiment.

FIG. 1 illustrates one exemplary implementation 100 of the opto-electronic system according to one embodiment. The system 100 receives an input electrical signal 172 from a RF signal generator or a RF input terminal 170 (e.g., a RF antenna as shown) and produces a processed output electrical signal 192a at an output terminal 192. The physical locations of the terminals 192 and 170 may be separated. An optical fiber line 140 is used to transmit and process the signal in the optical domain from the terminal 170 to the terminal 192. The system 100 can be spatially partitioned into two separate blocks 101 and 103 which are connected by the fiber line 140. The operations of the system 100, however, are not so partitioned as will be described below.

The system 100 includes an optical subcarrier generator 110 in the block 101 to produce an optical subcarrier signal 118 that is modulated at a local oscillator (LO) frequency and is linearly polarized. A polarization beam splitter (PBS) 130 is used to receive the subcarrier signal 118 and is oriented with respect to the polarization direction of the signal 118 so that the signal 118 transmits through the PBS 130. The signal 118 is then coupled into the fiber line 140 and is transmitted to the block 103. The fiber line 140 may be formed of a single-mode fiber. In general, the transmission in the fiber line 140 can change the polarization of the signal 118 so that the polarization of the signal 118 may no longer be linear after transmission. In fact, the polarization state of the signal 118 may vary or fluctuate when the fiber 140 is disturbed.

A second polarization beam splitter 150 is used in the block 103 to split the transmitted signal 118 into two different polarization components that are orthogonal to each other. Two polarization maintaining (PM) fibers 152 and 154 are coupled to receive the polarization components, respectively. The PM fiber 152 has its principal polarization axis aligned with the first polarization component that transmits through the PBS 150. A 90°-Faraday rotator 151 is coupled between the PM fiber 154 and the PBS 150 to rotate the polarization of the second polarization component by 90 degrees. The rotated polarization of the second polarization component is aligned with the principal polarization axis of the PM fiber 154. In one implementation, the two output ports of PBS 150 are pigtailed with PM fibers 152 and 154 and the polarization component in each port is aligned with the slow axis of the corresponding PM fiber.

An optical modulator 160 is coupled to the other distal ends of the two PM fibers 152 and 154 to form an optical ring. The modulator 160 has an electrical input port to receive the RF signal 172 and produces an optical modulation in response to the signal 172. This optical modulation hence converts the RF signal in the electrical domain into the optical domain and allows subsequent optical processing and transmission. Both amplitude and phase modulators may be used as the modulator 160. However, a phase modulator may be used to avoid the bias requirement of the amplitude modulator and to achieve a low optical loss. A phase modulator can also be less expensive and bulky that an amplitude modulator.

The modulator 160 may include two PM fiber pigtails at its opposite ends to couple the PM fibers 152 and 154 so that the polarization of the first polarization component from the first PM fiber 152 and the rotated polarization of the second polarization component from the second PM fiber 154 are substantially parallel to each other inside the optical modulator 160. For example, the slow axes of each pair of PM fibers are aligned at their connections. The light beams of the two polarization components passing through the modulator 160 are modulated essentially equally in response to the RF signal 172 and are automatically recombined by the PBS 150. The combined optical signal, now superimposed with the RF signal 172, is then coupled back into the single mode fiber 140.

The above polarization arrangement of in the optical ring with the PBS 150, the Faraday rotator 151, the PM fibers 152, 154, and the modulator 160 provides a number of advantages. For example, the oppositely traveling light beams have the same polarization direction in the modulator 160 at all times and are essentially independent of the polarization perturbation in the single-mode fiber 140. Hence, this ring arrangement can be used to essentially eliminate the polarization sensitivity of the modulator 160.

Another advantage of the above ring arrangement is that the use of the 90° Faraday rotator 151 maintains the polarization state of the combined optical signal from the PBS 150 to the fiber 140 to be orthogonal to the polarization state of the original forward-going signal at every point in the fiber 140. This is because the polarization rotation by the Faraday rotator 151 is irreversible regardless of the beam direction through the rotator 151. In an alternative implementation, two 45-degree Faraday rotators may be used to replace the single 90-degree Faraday rotator. For example, one 45-degree Faraday rotator may be coupled between the PM fiber 152 and the PBS 150 and another may be coupled between the PM fiber 154 and the PBS 150. Hence, the backward-going signal from the PBS 150 towards the fiber 140 and the PBS 130, if generated from the subcarrier signal 118, can be reflected by the PBS 130 and separated from the original subcarrier signal 118. Furthermore, this ring arrangement can be used to prevent a strong pump beam for the Brillouin amplification from entering the signal receiving part of the system 100 when the polarization of the pump beam is properly selected.

The signal receiving part of the system 100 includes, among other components, a photodetector 190 in the block 101. The detector 190 is coupled to receive the backward-going signal produced by the block 103 and convert it into an electrical output signal. A RF bias tee 192 may be directly coupled to the detector 192 to separate the DC or low frequency components 192b from the high frequency (IF, RF, and LO) components 192a of the received photocurrent. The component 192b, as described below, is used to lock the frequency of a pump laser 180 to an intended modulation sideband of the optical subcarrier signal 118 in the Brillouin selective sideband amplification.

One of the features of the system 100 is the Brillouin selective sideband amplification for signal amplification and processing. This feature is implemented in part by the pump laser 180, an optical circulator 132, the PBS 130, and the fiber 140 as the Brillouin medium. The fiber 140 serves both as an optical conduit between the blocks 101 and 103 and as the Brillouin medium. The optical circulator 132 is coupled in the optical path between the PBS 130 and the photodetector 190 to direct light from a port 132a to a port 132b, from the port 132b to a port 132c, and from the port 132c to the port 132a, respectively. The pump laser 180 is coupled to send a linearly-polarized pump beam to the port 132a which is directed as an output at the port 132b to the PBS 130. The photodetector 190 is coupled to receive light from the port 132c which receives light from the PBS 130 via the port 132b. The polarization of the pump beam is adjusted so that the pump beam is directed by the PBS 130 into the single mode fiber 140. In the embodiment shown in FIG. 1, the polarization of the pump beam should be orthogonal to the polarization of the subcarrier signal 118 from the generator 110 so that the signal 118 transmits through the PBS 130 to the fiber 140 and the pump beam is reflected by the PBS 130 to the fiber 140.

The pump beam, upon entering and interacting with the fiber 140, produces a backscattered Brillouin signal by using a portion of the pump beam. The remaining portion of the pump beam enters the ring in the block 103 and is fed back into to the PBS 130 via the single mode fiber 140. Because of the action of the ring as described above, the polarization state of the backward-going pump beam is orthogonal to the forward-going pump beam everywhere along the fiber 140. Hence, backward-going pump beam transmits through the PBS 130 towards the generator 110 rather than being reflected towards the optical circulator 132. This prevents the photodetector 190 from being saturated by the pump beam. An optical isolator 120 may be placed in the optical path between the generator 110 and the PBS 130 to attenuate the backward-going pump beam.

A sideband in the modulated subcarrier signal which is fed back from the ring towards the PBS 130 is a seed signal that propagates against the pump beam within the fiber 140. When the spectral bandwidth of a selected sideband in this seed signal is within the Brillouin gain bandwidth of the fiber 140 and the selected sideband substantially overlaps with the frequency of the backscattering Brillouin signal, the stimulated Brillouin scattering occurs and the selected sideband is amplified. Notably, the above arrangement ensures that the forward-going pump beam essentially has the same polarization state of the backward-going signal beam in the fiber 140. This desired condition allows the Brillouin amplification throughout the fiber 140 and effectively avoid the polarization sensitivity of the Brillouin amplification process.

Figure 2:
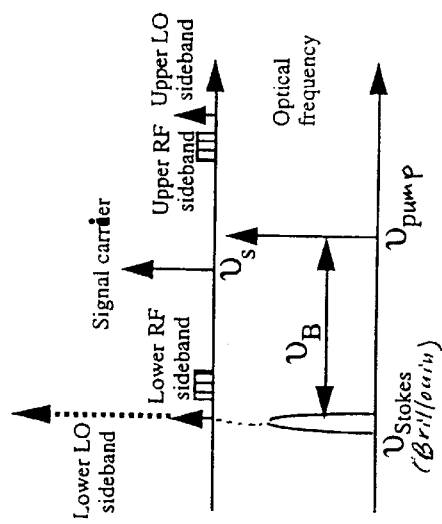
FIG. 2 illustrates different spectral components in different signals in the system in FIG. 1.

FIG. 2 illustrates the optical frequency spectra of the subcarrier signal 118 from the generator 110, the pump beam from the laser 180, and the Stokes frequency of the pump laser's Brillouin scattering. The upper spectrum shows the spectral bands in the backward-going modulated subcarrier signal produced by the ring in which both LO sidebands produced by the generator 110 and the RF sidebands produced by the modulator 160 in the ring. In the example shown in FIG. 2, the Brillouin signal is aligned with the first lower LO sideband which is amplified.

In general, either a LO sideband or a RF sideband may be amplified to obtain amplified IF and RF signals at the output of the photodetector 190. Amplifying a LO sideband has the advantage of a wide amplification bandwidth and signal conversion bandwidth. On the other hand, amplifying a RF sideband generally results in higher gain, assuming that the RF sideband is weaker than the LO sideband. When the lower LO sideband is amplified by this amplification process, the beats of the amplified LO sideband with the lower and upper RF sideband in the photodetector 190 can produce down-converted and up-converted IF signals, respectively, while the beat between the amplified LO sideband and the signal carrier produces an amplified LO signal.

The selection of a desired sideband may be achieved by tuning the frequency of the pump laser 180 to selectively overlap the frequency of the backscattered Brillouin signal with that desired sideband. When the modulator 160 is a phase modulator, the amplification of this modulation sideband will break the perfect amplitude balance of sidebands of a phase modulation and cause the phase modulation to convert to an amplitude modulation. See the details on the above frequency conversion and phase-to-amplitude conversion in, e.g., U.S. patent application Ser. No. 09/006,845 filed on Jan. 14, 1998 by Yao (allowed and to be issued).

Figure 3:
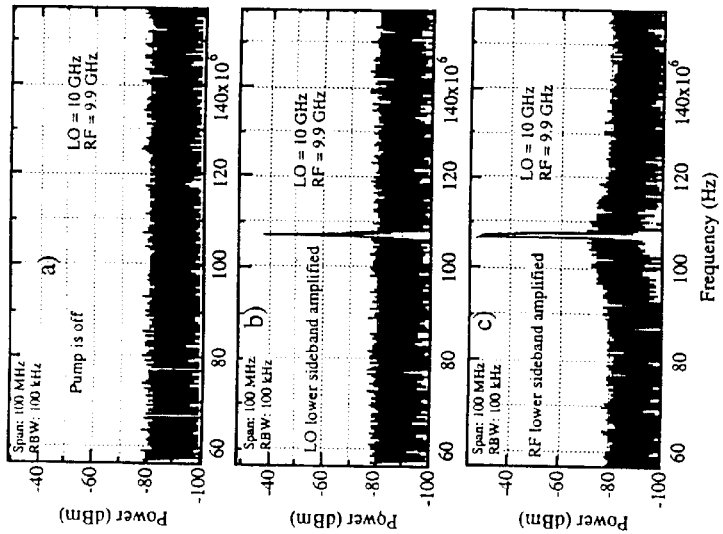
FIGS. 3 and 4 show measured results from a system built based on the design in FIG. 1.
Figure 4:
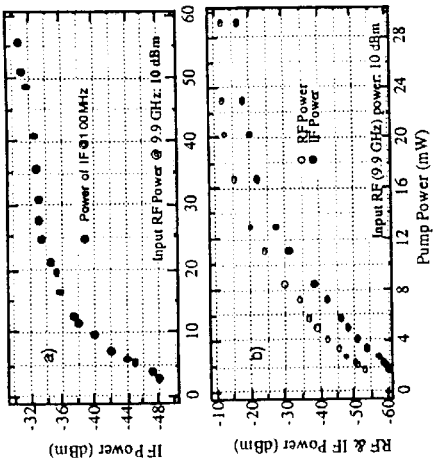

FIGS. 3 and 4 show measured results from a system built based on the design 100 in FIG. 1. The RF and LO frequencies are about 9.9 GHz and 10 GHz, respectively, and the expected down converted signal should be at 100 MHz. FIG. 3 includes measured signal power levels in BSSA assisted frequency down conversion. The top trace is the data without Brillouin amplification in which no down-converted signal at 100 MHz was detected. The middle trance shows that a LO lower sideband is amplified by aligning with the Stokes frequency of the pump. The bottom trance shows a Lower RF sideband is aligned with the Stokes frequency of the pump and is amplified. In both cases, a frequency down conversion of about 100 MHz is achieved.

In FIG. 4, the top plot represents measured IF power levels as a function of pump power when the lower LO sideband is aligned with the pump Stokes frequency and amplified. The bottom plot shows the measured lower IF and RF power levels as function of pump power when the lower RF sideband is amplified. Note that due to the nature of phase modulation by a phase modulator 160, there are no received RF and IF powers when BSSA is not present.

In the above measurements, the stimulated Brillouin scattering (SBS) threshold was measured to be about 15 mW. However, the Brillouin amplification has no threshold and significant signal amplification and down-conversion was observed even when the pump power was much lower than the SBS threshold. Additional measurements suggest that only a few milliwatts of pump power would sufficiently amplify LO or RF sideband and hence convert signals from RF to IF.

Referring back to FIG. 1, it is desirable to tune the frequency of the pump laser 180 to overlap the Brillouin signal frequency with a desired sideband and to stabilize the frequency of the pump laser 180 at a particular frequency to maintain a sufficient Brillouin gain. Hence, the pump laser 180 may be a tunable laser. In addition, the system 100 uses a frequency locking mechanism to stabilize the pump laser 180 so as to prevent the relative frequency drift. This mechanism is based on the fact that when a signal sideband is optimally amplified, the received DC signal in the photodetector 190 is also maximized. It is evident that, when the pump power is below the SBS threshold and the lower LO sideband is not amplified (the Stokes of the pump is tuned away from the LO sideband), the received DC voltage is small, mostly contributed by the signal carrier. However, when the LO sideband is selectively amplified (when the Stokes is aligned with LO sideband), the received DC voltage is significantly increased, largely resulting from the amplified LO sideband. Even for the case that the pump power is above the SBS threshold, the photovoltage generated by the amplified LO sideband (when LO sideband is aligned with the Stokes) is still significantly larger than that generated by the SBS power (when LO sideband is not aligned with the Stokes). The bias tee 192 is used to monitor the DC and low frequency components from the photodetector 190. A laser control unit 182 is used to control the frequency of the pump laser 180 in response to the signal 192b so that the signal level of the 192b can be maximized.

The subcarrier generator 110 may be implemented in a number of configurations. In FIG. 1, the generator 110 includes a signal laser 112, an optical modulator 116, and a local oscillator device 114. The modulator 116 modulates a laser beam from the laser 112 to produce the subcarrier signal 118 which has LO sidebands. The modulator 116 may be an amplitude modulator or a phase modulator. The phase modulator may be preferred in some applications because it is easier to make, has lower loss, and needs no bias.

The generator 110 may also use an opto-electronic oscillator (OEO) to produce the subcarrier signal 110 with modulated sidebands. An OEO may include an electrically controllable optical modulator and at least one active opto-electronic feedback loop that comprises an optical part and an electrical part interconnected by a photodetector. The opto-electronic feedback loop receives the modulated optical output from the modulator and converted it into an electrical signal to control the modulator. The loop produces a desired delay and feeds the electrical signal in phase to the modulator to generate and sustain both optical modulation and electrical oscillation in radio frequency spectrum when the total loop gain of the active opto-electronic loop and any other additional feedback loops exceeds the total loss.

OEOs use optical modulation to produce oscillations in frequency spectral ranges that are outside the optical spectrum, such as in RF and microwave frequencies. The generated oscillating signals are tunable in frequencies and can have narrow spectral linewidths and low phase noise in comparison with the signals produced by other RF and microwaves oscillators. Notably, the OEOs are optical and electronic hybrid devices and thus can be used in optical communication devices and systems.

Examples of OEOs are disclosed in U.S. Pat. Nos. 5,723,856, 5,777,778, 5,917,179, and 5,929,430, and U.S. patent application Ser. No. 09/491,988 filed January 2000. The OEOs can directly generate a stable and spectrally pure subcarrier signals that can be used for frequency down/up conversion. For example, the phase noise for 10 GHz subcarrier signals of some OEOs is measured to be −140 dBc/Hz at 10 kHz away from the carrier.

Figure 5A:
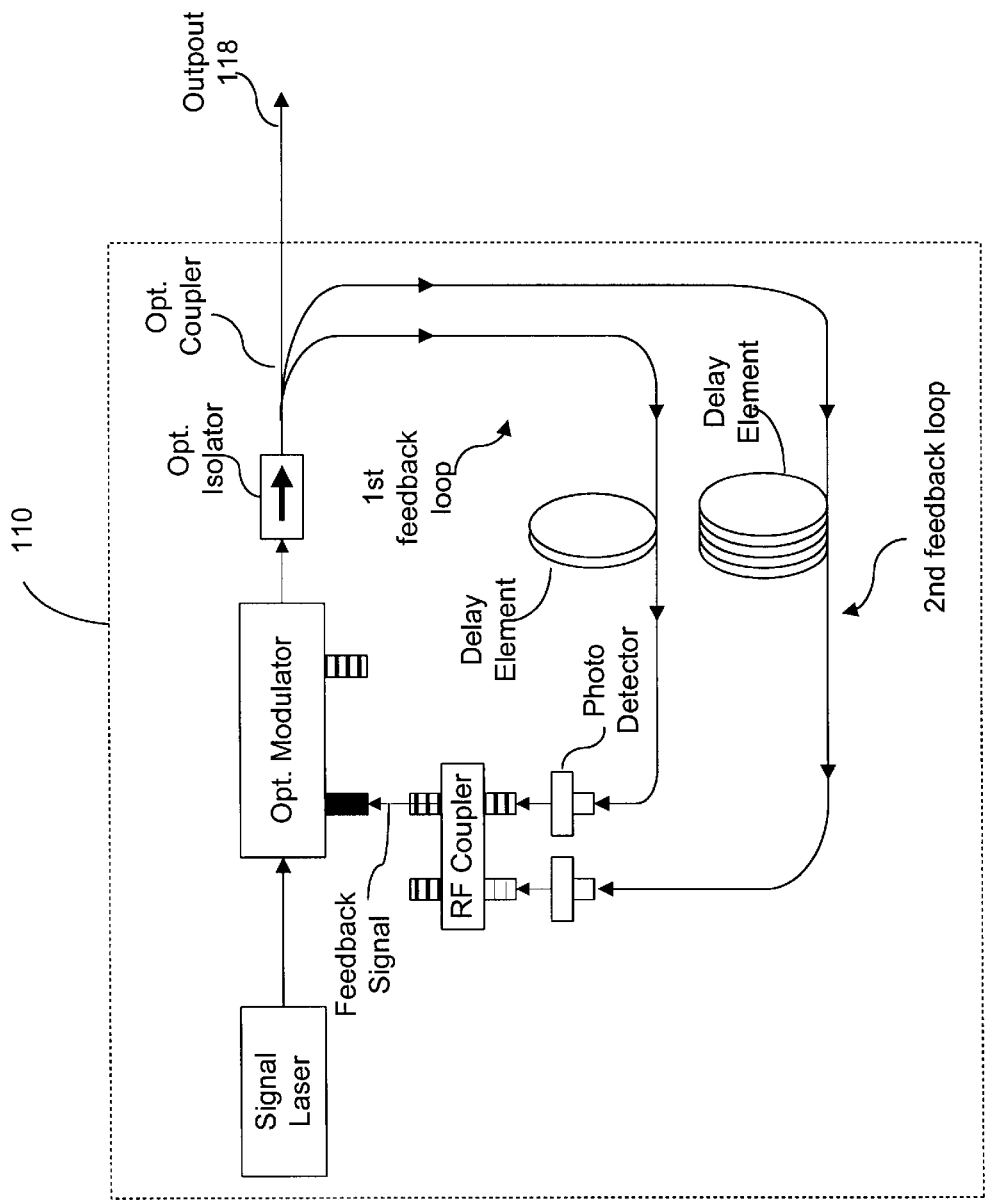
FIGS. 5A, 5B, and 5C shows examples of opto-electronic oscillators suitable for use in the system in FIG. 1.
Figure 5B:
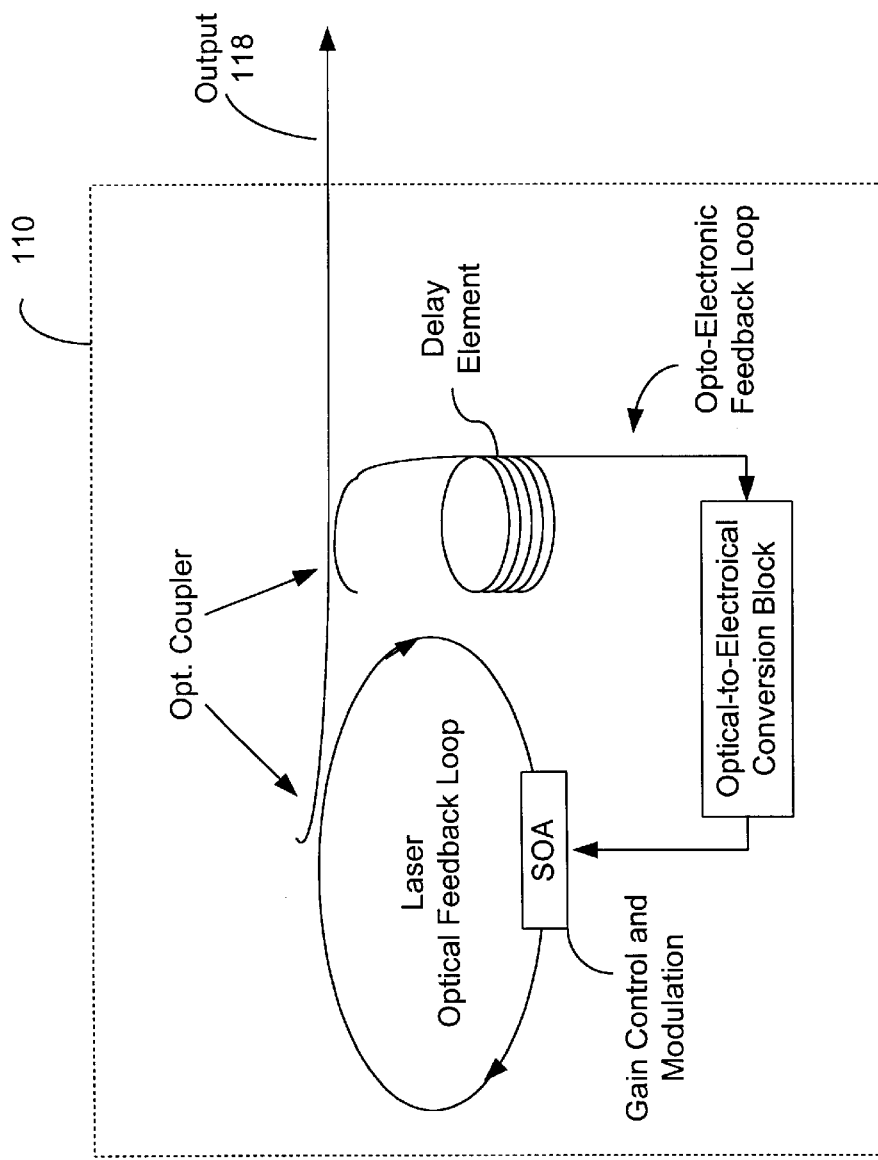
Figure 5C:
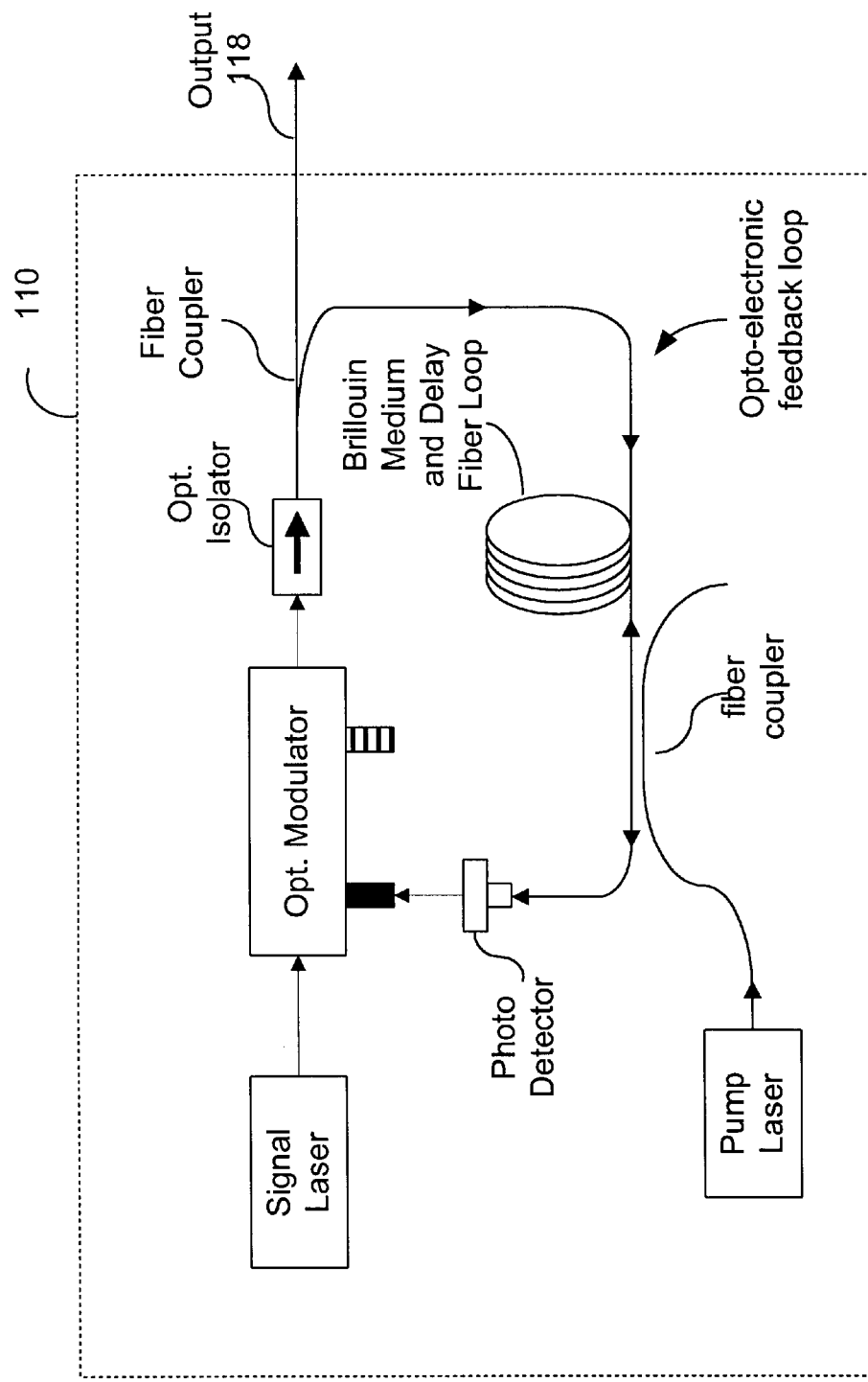

FIGS. 5A, 5B, and 5C show signal generators 110 based on OEOs in three different configurations. FIG. 5A shows a dual-loop loop OEO in which an optical delay element such as a fiber loop or an optical resonator is included in each loop. The optical resonator as a delay element in this and other OEOs may be a Fabry-Perot resonator, a fiber ring resonator, or a microsphere resonator operating in whispering-gallery modes. Alternatively, one of the loop may be replaced with an electrical feedback loop. FIG. 5B shows a coupled OEO which directly couples a laser oscillation in an optical feedback loop to an electrical oscillation in an opto-electronic feedback loop. The optical gain is controllable by an electrical signal from the opto-electronic loop, e.g., a semiconductor optical amplifier (SOA) may be disposed in the optical loop. In addition, opto-electronic oscillators can also be implemented by having at least one active opto-electronic feedback loop that generates an electrical modulation signal based on the stimulated Brillouin scattering. FIG. 5C shows such a Brillouin OEO which includes a Brillouin optical medium in the feedback loop and uses the natural narrow linewidth of the Brillouin scattering to select a single oscillating mode.

The system 100 in FIG. 1 is designed so that many devices therein can perform two or more different operations. For example, the pump laser 180 is used both for Brillouin signal amplification and for phase to amplitude modulation conversion when at least one of the modulators 116 and 160 is a phase modulator. The modulator 116 is to generate LO subcarrier and to reduce the unwanted Brillouin scattering of the signal light. The polarization beam splitter, PBS 130, is used to combine the signal and pump beams into the single mode fiber 140, and also to direct them into different paths after they return from the ring in block 103. The single-mode fiber 140 is used both as a signal transmission medium and as a gain medium for Brillouin amplification. Furthermore, the ring arrangement in the block 103 is to perform three different operations: 1) returning the modulated RF signal, 2) making the modulator polarization-insensitive, and 3) making the Brillouin amplification polarization-insensitive.

The above disclosure only includes a few embodiments. However, it is understood that variations and enhancements may be made without departing from the following claims.

What is claimed is:

1. A system, comprising:
   an input terminal to receive an input electrical signal; and
   an opto-electronic module comprising an optical amplifier with a Brillouin medium which produces a pump beam in said Brillouin medium to generate a Brillouin signal, and an optical ring unit having an optical modulator coupled to said input terminal to superimpose said input electrical signal onto an optical signal,
   wherein said optical ring unit is adapted to couple said optical signal into said Brillouin medium with a polarization substantially identical to a polarization of said pump beam to selectively amplify a sideband in said optical signal, and
   wherein said opto-electronic module further includes a photodetector to convert said amplified optical signal into an output electrical signal.

2. The system as in claim 1, wherein said opto-electronic module includes an optical subcarrier generator coupled to generate said optical signal with local oscillator sidebands.

3. The system as in claim 2, wherein said optical subcarrier generator includes a signal laser, a local oscillator circuit to produce a local oscillator signal, an optical modulator to modulate a laser beam from said signal laser in response to said local oscillator signal to produce said optical signal.

4. The system as in claim 3, wherein said optical subcarrier generator includes an opto-electronic oscillator which comprises an electrically controllable optical modulator and at least one active opto-electronic feedback loop that comprises an optical part with an optical delay element to receive a portion of an optical signal form said modulator and an electrical part interconnected by a photodetector to produce a control signal to said modulator.

5. The system as in claim 4, wherein said optical delay element includes a fiber loop.

6. The system as in claim 4, wherein said optical delay element includes an optical resonator.

7. The system as in claim 4, wherein said optical part of said opto-electronic feedback loop includes a Brillouin medium to amplify a selected modulation sideband in said optical signal.

8. The system as in claim 4, wherein said opto-electronic oscillator further includes an optical loop in which said optical modulator is disposed to modulate an optical gain in said optical loop.

9. The system as in claim 2, wherein said optical ring unit includes:
   a polarization beam splitter coupled to receive said optical signal that transmits through said Brillouin medium from said subcarrier generator to split said optical signal into a first and a second optical signals with orthogonal polarizations;
   a first polarization maintaining fiber having a first terminal to receive said first optical signal and a second terminal coupled to one terminal of said optical modulator;
   a 90-degree Faraday rotator coupled to rotate a polarization of said second optical signal; and
   a second polarization maintaining fiber having a first terminal to receive said second optical signal from said Faraday rotator and a second terminal coupled to another terminal of said optical modulator so that said first and said second optical signals have the same polarization inside said optical modulator.

10. The system as in claim 9, wherein said optical modulator is a phase modulator.

11. The system as in claim 9, wherein said opto-electronic module further includes:
a pump laser to produce said pump beam with a pump polarization orthogonal to a polarization of said optical signal; and
a first polarization beam splitter in an optical path between said subcarrier generator and said Brillouin medium and orientated with respect to said polarization of said optical signal to direct both said optical beam and said pump beam to said Brillouin medium and to direct said amplified optical signal to a direction opposite to said pump beam.

12. The system as in claim 11, wherein said opto-electronic module further includes an optical circulator to direct said pump beam to said first polarization beam splitter and to direct said amplified optical signal to said photodetector.

13. The system as in claim 11, wherein said opto-electronic module further includes:
an electronic unit to split DC and low frequency components from said output electrical signal from said photodetector to provide a control signal to said laser control unit, wherein said laser control unit is operable to control said pump according to said control signal; and
a laser control unit operable to control said pump laser according to said control signal.

14. The system as in claim 1, wherein said optical modulator is an amplitude modulator.

15. The system as in claim 1, wherein said optical modulator is a phase modulator.

16. The system as in claim 1, wherein said Brillouin medium includes an optic fiber.

17. A system, comprising:
an optical subcarrier generator to generate a linearly-polarized optical signal with local oscillator sidebands;
a pump laser to produce a pump beam whose polarization is orthogonal to said optical signal;
a first polarization beam splitter to combine said optical signal and said pump beam to overlap and to copropagate;
an optic fiber line coupled to receive said optical signal and said pump beam and responsive to said pump beam to produce a Brillouin signal in a direction against said pump beam;
an optical ring unit coupled to one end of said optic fiber line to receive said pump beam and said optical signal that transmit through said fiber line, said ring unit having an optical modulator to superimpose an input electrical signal onto said optical signal and said pump beam and adapted to return said optical signal into said fiber line, wherein said returned optical signal has a polarization substantially identical to said polarization of said pump beam that propagates in said fiber line from said first polarization beam splitter to said ring unit to selectively amplify a sideband in said returned optical signal, and wherein said returned pump beam has polarization substantial orthogonal to said polarization of said pump beam that propagates in said fiber line from said first polarization beam splitter to said ring unit; and a photodetector to convert said amplified returned optical signal into an output electrical signal.

18. The system as in claim 17, wherein said ring unit includes:
a second polarization beam splitter coupled to receive said optical signal that transmits through said fiber line to split said optical signal into a first and a second optical signals with orthogonal polarizations;
a first polarization maintaining fiber having a first terminal to receive said first optical signal and a second terminal coupled to one terminal of said optical modulator;
a 90-degree Faraday rotator coupled to rotate a polarization of said second optical signal; and
a second polarization maintaining fiber having a first terminal to receive said second optical signal from said Faraday rotator and a second terminal coupled to another terminal of said optical modulator so that said first and said second optical signals have the same polarization inside said optical modulator.

19. The system as in claim 18, wherein said optical modulator in said ring unit is a phase modulator.

20. The system as in claim 18, wherein said optical subcarrier generator includes a signal laser, a local oscillator circuit to produce a local oscillator signal, an signal optical modulator to modulate a laser beam from said signal laser in response to said local oscillator signal to produce said optical signal.

21. The system as in claim 20, wherein said signal optical modulator in a phase modulator.

22. The system as in claim 18, wherein said optical subcarrier generator includes an opto-electronic oscillator which comprises an electrically controllable optical modulator and at least one active opto-electronic feedback loop that comprises an optical part with an optical delay element to receive a portion of an optical output signal form said electrically controllable optical modulator and an electrical part interconnected by a converting photodetector to produce a control signal to said electrically controllable optical modulator.

23. The system as in claim 22, wherein said optical delay element includes a fiber loop.

24. The system as in claim 22, wherein said optical delay element includes an optical resonator.

25. The system as in claim 22, wherein said optical part of said opto-electronic feedback loop includes a Brillouin medium to amplify a selected modulation sideband in said optical output signal in said optical part.

26. The system as in claim 22, wherein said opto-electronic oscillator further includes an optical loop in which said electrically controllable optical modulator is disposed to modulate an optical gain in said optical loop.

27. A method, comprising:
modulating a laser beam in response to a local oscillator signal to produce an optical signal having local oscillator signal sidebands;
directing said optical signal into a Brillouin medium which is pumped by a pump beam propagating in the same direction in said medium as said optical signal;
transmitting said optical signal through said medium;
modulating said optical signal that transmits through said medium to superimpose information in an electrical signal onto said optical signal to produce signal modulation sidebands;
returning said optical signal back to said medium with a polarization substantially identical to a pump polarization of said pump in an opposite direction to amplify a sideband in said returned optical signal based on a Brillouin amplification process in said medium; and converting said amplified optical signal into an output electrical signal.

28. The method as in claim 27, comprising:

adjusting a frequency of said pump beam to a desired sideband in said returned optical signal to obtain frequency up conversion.

29. The method as in claim 27, comprising:

adjusting a frequency of said pump beam to a desired sideband in said returned optical signal to obtain frequency down conversion.

30. The method as in claim 27, wherein said signal modulation sidebands are produced by a phase modulation, further comprising adjusting a frequency of said pump beam to a desired sideband away from a carrier frequency of said returned optical signal to obtain a phase-to-amplitude conversion.

31. The method as in claim 27, further comprising actively controlling a frequency of a pump laser that produces said pump beam to maximize a DC component in said output electrical signal.

32. The method as in claim 27, wherein said Brillouin medium includes a fiber line.

33. The method as in claim 32, further comprising using said fiber line to spatially separate a location where the input electrical signal is received and a location where the output electrical signal is produced.

34. The system as in claim 1, further comprising a RF antenna coupled to said optical modulator to covert a RF wave signal into said input electrical signal.

35. The system as in claim 17, further comprising a RF antenna coupled to said input terminal to covert a RF wave signal into said input electrical signal.

36. The method as in claim 27, further comprising using a RF antenna to convert a RF wave signal into said electrical signal.

* * * * *